J. A. CONNOR.
WHEEL TIRE RIM.
APPLICATION FILED JULY 25, 1907.
909,368
Patented Jan. 12, 1909.
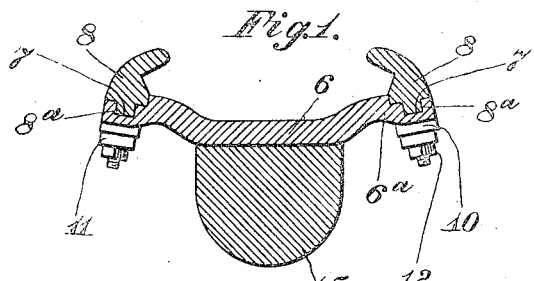
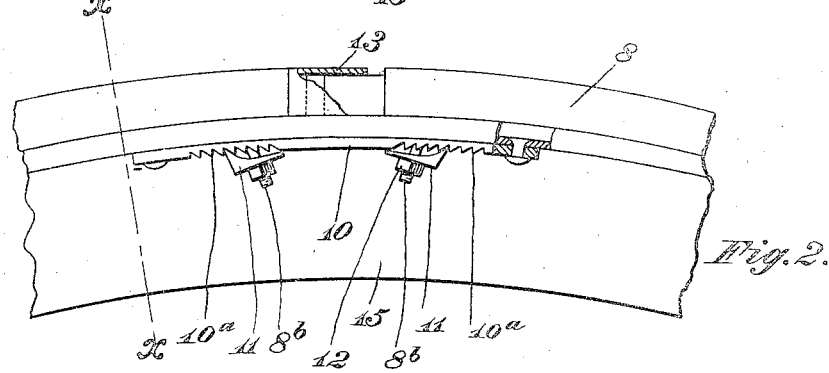
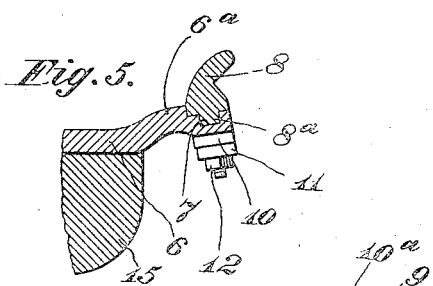
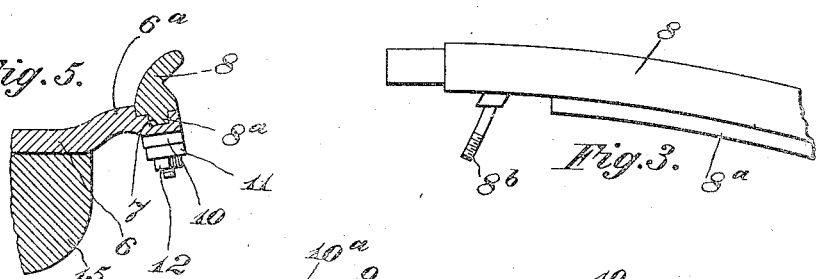
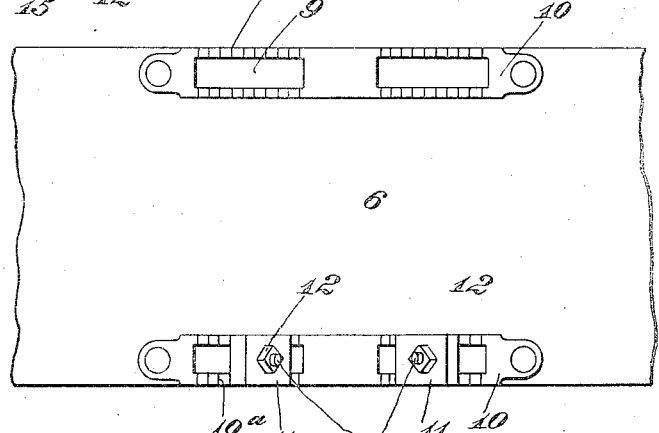
Witnesses
Benj. Finckel
James Strader
Inventor
Joseph A. Connor
by Finckel & Finckel
his Attorneys

UNITED STATES PATENT OFFICE.

JOSEPH A. CONNOR, OF GROGAN, OHIO.

WHEEL TIRE-RIM.

No. 909,368.　　　Specification of Letters Patent.　　　Patented Jan. 12, 1909.

Application filed July 25, 1907. Serial No. 385,499.

*To all whom it may concern:*

Be it known that I, JOSEPH A. CONNOR, a citizen of the United States, residing at Grogan, in the county of Franklin and State of Ohio, have invented a certain new and useful Improvement in Wheel Tire-Rims, of which the following is a specification.

The invention relates more particularly to wheel tire rims having removable flanges. The main object of this invention is to provide such a rim in which the principal parts can be constructed of rolled metal.

Another object is to so construct such a tire rim that it can be easily located and shrunk or otherwise secured on the felly.

A further object is to so construct such a tire rim that the flange member can be reversed to convert the rim from a clencher to a non-clencher channel or conversely.

The invention is embodied in the construction hereinafter described and particularly pointed out in the appended claims, the invention not being confined in its embodiment to precisely the forms shown.

In the accompanying drawings—Figure 1 is a transverse sectional view of the parts on the line $x$—$x$ Fig. 2; Fig. 2 is a side view, with parts in section, of a fraction of the device showing the means for adjusting and securing the flange member or ring; Fig. 3 is a side view of one of the flange members removed; Fig. 4 is a view of the inner side of the rim at the point containing the ring fastening devices; Fig. 5 is a detail fractional sectional view like Fig. 1, showing a flange member or ring reversed in its seat.

In the views 6 designates the rim body proper. This body has at its edges outwardly flaring or inclined symmetrical portions as seen at $6^a$, said portions being provided with inverted T shaped grooves forming seats as seen at 7 to receive the removable flange members or rings 8. The seat 7 is itself of symmetrical form and the inner edge or base of the ring 8 is formed with a tongue $8^a$ to match the seat so that the ring when reversed also fits in the seat and as will be seen by a comparison of the right hand side of Fig. 1 with what is shown in Fig. 5. The flare of the edges $6^a$ is such that the flared portions form a larger circle than the central portion of the rim and outer rim of the felly 15 hence the rim can be slid or moved laterally onto the felly and shrunk or otherwise secured thereon.

From the construction shown and described, it will be observed that when an inflatable tire is seated and inflated in the rim, lateral pressure at its base or inner side is borne directly and conjointly by the outer inclined face of the flaring portion $6^a$ and the removable flange. The removable flanges are thus relieved of much of the strain to which they would be subject in the absence of such inclined portion.

As I show it herein each edge of the rim is provided with a slot 9 cut through the bottom of the inverted T shaped seat and opposite this slot at the inner side of the rim is riveted or otherwise suitably secured a small slotted plate 10 provided on its exposed face at each end with a set of serrations or teeth as seen at $10^a$ the teeth of each set pointing toward the teeth of the opposite set. The rings 8 are each of a single rolled piece of metallic bar bent to form what is known as a split or spring ring and each of its ends is provided with a bolt $8^b$ shown to be slightly curved and threaded. When the ring 8 is properly placed in the groove 7 the bolts $8^b$ project through the slots of the main rim and plate 10, and on the bolts are placed toothed washers as seen at 11 to engage the toothed plate 10 and nuts as seen at 12. By turning up the nuts 12 therefore the ends of the ring 8 are drawn toward each other and the ring tightened in its seat. The curved bolts coöperate with the toothed washer in drawing together the end of the ring. If the first adjustment of the washers be insufficient to secure the requisite tightness or should the ring from any cause become slack or loose in its seat the toothed washer or either of them can be adjusted to bring them closer together when upon turning the nut or nuts the requisite tightness of the ring can be obtained.

To close the space between the ends of the ring 8 I can use a small tube like device 13 secured on one end of the ring and freely receiving the other end of that member. The flare of the edges $6^a$ can be sufficient to allow the passage of the added toothed plate 10 over the rim of the felly.

The rim body and its flared edges, it will be observed, can be made out of strips of sheet metal or bars of metal rolled in suitably formed die rollers. After being rolled the strips can be cut into proper lengths, the ends of which can be welded to form the rim of necessary diameter. The flange members also can, as before indicated, be rolled out of bars and cut and bent to proper length and form.

The rim thus constructed can be very economically manufactured and applied. It will be more durable and reliable in use than cast metal and the fact that the flange members are reversible makes them interchangeable, one style of rolled bar sufficing.

What I claim and desire to secure by Letters Patent is:

1. A wheel rim comprising, in combination, a body portion having in cross section a straight central portion to fit on the felly, an outwardly inclined or flaring portion 6ª extending from each edge of said central portion, said flaring portions having inclined outer faces and provided at their extreme edges with groove seats, removable flange members, and means for securing them in said seats, whereby lateral pressure of the base or inner side of the tire is borne conjointly by the outwardly inclined portions of the rim and the removable flange members, substantially as described.

2. A wheel tire rim comprising, in combination, a body portion having its central portion substantially straight in cross section and its integral edge portions inclined or flaring outwardly from the central portion to form tire seats, the outer portions of said inclined or flaring portions provided with seats substantially T-shaped in cross section to receive removable flange members, flange members provided with tongues to fit in said seats and means for securing the flange members in their seats whereby lateral pressure of the tire is borne jointly by said flaring portions and said flange members, substantially as described.

3. In combination with a wheel rim provided with a slot and adjacent said slot at its inner side two sets of teeth, the teeth of each set pointing toward the teeth of the opposite set, a broken tire retaining ring provided at its ends with threaded bolts or projections to pass through the slotted portion of the rim, said projections being inclined toward each other, and movable toothed washers on said projections to engage the teeth of the rim, and threaded nuts on said projections to press said washer into engagement with the teeth of the rim.

JOSEPH A. CONNOR.

Witnesses:
BENJAMIN FINCKEL,
JAMES STRADER.